Sept. 11, 1962   H. H. HAAS   3,053,542
CRANKCASE AND SPLIT RING SEAL CONSTRUCTION
Filed May 12, 1958
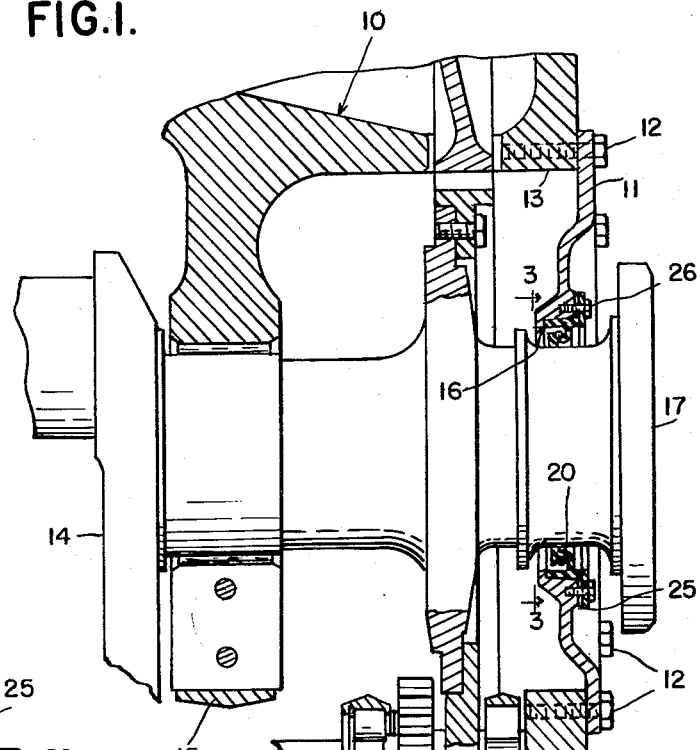
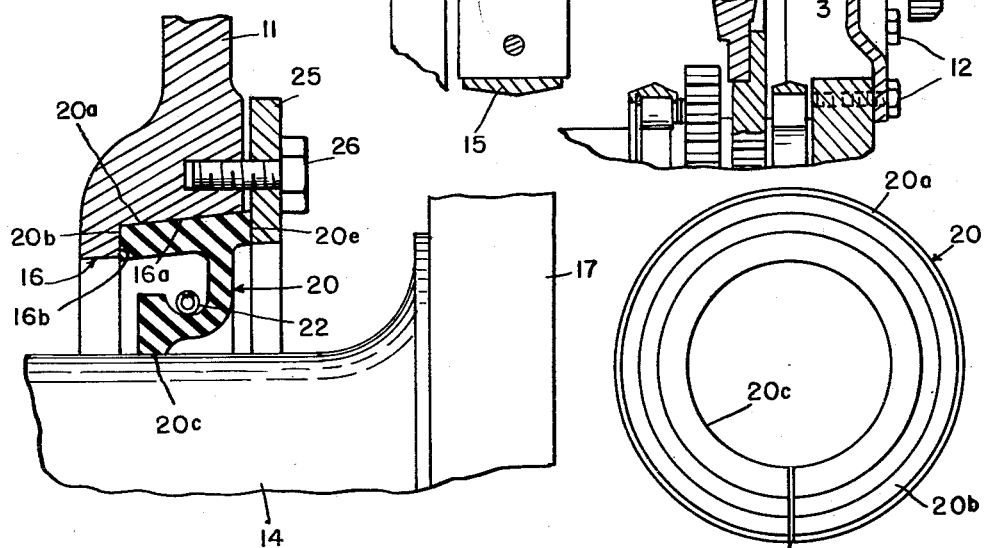
INVENTOR.
HERBERT H. HAAS
BY
ATTORNEYS 3,053,542
Patented Sept. 11, 1962

3,053,542
CRANKCASE AND SPLIT RING SEAL CONSTRUCTION
Herbert H. Haas, Royal Oak, Mich., assignor, by mesne assignments, to Continental Motors Corporation, Muskegon, Mich., a corporation of Virginia
Filed May 12, 1958, Ser. No. 734,701
3 Claims. (Cl. 277—115)

This invention relates to internal combustion engine crankcase and seal construction, and more particularly to a construction acting to close the gap between the ends of a split ring seal such as is used to seal the opening in the crankcase through which the driving end of the crankshaft extends.

Split ring seals are required in such engine locations as the crankcase opening through which the crankshaft extends since the crankshaft generally has an outer flange over which the usual type of seal will not pass. However, the presence of the gap presents a problem in leakage, which heretofore has been practically ignored, other than to attempt to provide a seal which is so carefully made that its ends will meet when installed.

An object of the present invention is to improve sealing of the crankcase opening by providing a split ring seal and opening edge construction which will act to close the gap between the ends of the seal.

Another object of the invention is to improve sealing of the crankcase opening by providing a tapered split ring seal and a matching tapered crankcase opening edge which will coact with the seal to exert pressure thereon tending to close the gap between the ends.

Still another object of the present invention is to improve sealing of the crankcase opening by providing a split ring seal with a sealing surface and biasing means urging the sealing surface into contact with the crankcase which is operably independent of the means closing the gap between the ends.

For a more complete understanding of the invention, reference may be had to the accompanying drawing illustrating a preferred embodiment of the invention in which like reference characters refer to like parts throughout the several views, and in which FIG. 1 is a fragmentary cross-sectional view of an internal combustion engine crankcase embodying the split ring seal of the present invention.

FIG. 2 is an enlarged fragmentary detail of a portion of the construction of FIG. 1, and FIG. 3 is an elevational view of the split ring seal as seen from the line 3—3 of FIG. 1 with the housing and shaft removed.

A preferred internal combustion engine crankcase 10 is illustrated as preferably having an end plate 11 secured by any means such as bolts 12 to cover an end opening 13 through which a crankshaft 14 may be removed and installed, the crankshaft 14 being carried in the crankcase 10 by a bearing structure 15.

The end plate 11, in essence a part of the crankcase 10, has an opening 16 through which extends the crankshaft 14 having an outer flange 17.

An annular ring seal member 20, being split as shown at 21 in FIG. 3 to facilitate installation and removal over the flange 17, is provided to form a seal between the crankshaft 14 and the opening 16 through which it extends. The split ring seal 20 is constructed with an annular tapered outer peripheral surface 20a as illustrated, an annular shoulder 20b disposed in a plane lying substantially normal to the axis of the crankshaft 14, and preferably a sealing lip 20c adapted to encircle the crankshaft 14. An annular spring 22 or other suitable means may be inserted in the seal 20 as shown in FIG. 2 to assist sealing around the crankshaft 14.

The end plate opening 16 has a tapered annular peripheral surface 16a and an annular abutment or shoulder 16b as clearly illustrated in FIG. 2, respectively adapted to match and engage the peripheral surface 20a and shoulder 20b of the seal 20.

When the split ring seal 20 is axially installed in the opening 16, the tapered surfaces 16a and 20a coact to exert distorting inward pressure on the seal 20, tending thus to close the gap 21 and provide for most effective sealing of the opening 16.

The sealing lip 20c is not effected by the pressures exerted by the coacting surfaces 16a and 20a and is maintained in sealing contact with the crankshaft 14 by the annular spring 22. In this way excessive friction on the lip 20c can be avoided even though relatively high pressure may be produced to provide an effective closure of the gap 21.

If desired, a retainer ring 25 may be secured to the end plate 11 by any means such as bolts 26, said ring 25 adapted to abut an annular portion 20e which extends beyond the opening 16, such that securing the ring 25 acts to force the split ring seal 20 axially inward against the tapered surface 16a and the shoulder 16b to increase the effect of the aforesaid gap closing pressure. It is apparent that the ring 25 must be made in two halves in order to facilitate installation.

Although I have described only one preferred embodiment of the invention, it will be apparent to one skilled in the art to which the invention pertains that various changes and modifications may be made therein without departing from the spirit of the invention or the scope of the appended claims.

I claim:

1. In an internal combustion engine, a crankcase having an annular opening at one end, a crankshaft carried by said crankcase and extending through said opening, a distortable annular split ring seal disposed around said crankshaft in said crankcase opening and providing sealing contact between the inner periphery of said opening and said crankshaft, said seal having a formed tapered outer peripheral surface, the inner periphery of said opening being tapered complementary with the outer peripheral surface of said seal to coact therewith and to exert distorting pressure radially inward on said seal upon axial insertion of same in said opening, said pressure being operable to close the gap between the ends of said seal, said seal further being provided with an inner annular portion having an annular sealing surface, means urging said portion radially inwardly to retain said sealing surface in contact with said crankshaft, said urging means and said sealing surface being operably independent of the gap closing operation of said coacting tapered outer peripheral surface and said tapered inner periphery of said opening.

2. In an internal combustion engine, a crankcase having an annular opening at one end, a crankshaft carried by said crankcase and extending through said opening, a distortable annular split ring seal disposed around said crankshaft in said crankcase opening and providing sealing contact between the inner periphery of said opening and said crankshaft, said seal having a formed tapered outer peripheral surface and an annular shoulder disposed in a plane substantially normal to the axis of said crankshaft, the inner periphery of said crankcase opening having a tapered surface complementary with the tapered surface of said seal and an annular shoulder adapted to abut the annular shoulder of said seal, said tapered surfaces coacting to exert distorting pressure radially inward on said seal upon axial insertion of same in said opening and to close the gap between the ends of said seal, said seal further being provided with an inner annular portion having an annular sealing surface, means urging said portion radially inwardly to retain said sealing surface in contact with said crankshaft, said urging means and said sealing surface being operably independent of the gap closing operation of said coacting tapered outer peripheral surface and said tapered inner periphery of said opening.

3. In an internal combustion engine, a crankcase having an annular opening at one end, a crankshaft carried by said crankcase and extending through said opening, a distortable annular split ring seal disposed around said crankshaft in said crankcase opening and providing sealing contact between the inner periphery of said opening and said crankshaft, said seal having a formed tapered outer peripheral surface, the inner edge of said opening being tapered to coact with the tapered surface of said seal to exert distorting pressure radially inward on said seal upon axial insertion of same in said opening and to close the gap between the ends of said seal, said seal having an annular edge extending outwardly of said crankcase opening, an annular retainer ring, means securing said retaining ring to said crankcase in contact with said annular edge of said seal and operable to exert axial pressure thereon, said seal further being provided with an inner annular portion having an annular sealing surface, means urging said portion radially inwardly to retain said sealing surface in contact with said crankshaft, said urging means and said sealing surface being operably independent of the gap closing operation of said coacting tapered outer peripheral surface and said tapered inner periphery of said opening.

References Cited in the file of this patent

UNITED STATES PATENTS

| | | |
|---|---|---|
| 1,528,895 | Schmidt | Mar. 10, 1925 |
| 1,740,929 | Loock | Dec. 24, 1929 |
| 2,209,578 | Rainey | July 30, 1940 |
| 2,234,520 | De Shong | Mar. 11, 1941 |
| 2,335,561 | Dodge | Nov. 30, 1943 |
| 2,368,380 | Ruzicka | Jan. 30, 1945 |
| 2,486,928 | Cole | Nov. 1, 1949 |
| 2,547,257 | Cole | Apr. 3, 1951 |
| 2,736,586 | Riesing | Feb. 28, 1956 |
| 2,896,980 | Dicky | July 28, 1959 |

OTHER REFERENCES

Publication: "The Garlock Klozure," pages 12 and 13, Oct. 30, 1957.